United States Patent
Kitamura

(10) Patent No.: US 7,574,058 B2
(45) Date of Patent: Aug. 11, 2009

(54) IMAGE PROCESSING APPARATUS, METHOD AND PROGRAM ON A COMPUTER-READABLE MEDIUM THAT INCREASES COMPRESSION RATE

(75) Inventor: Yoshiro Kitamura, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 635 days.

(21) Appl. No.: 11/201,299

(22) Filed: Aug. 11, 2005

(65) Prior Publication Data
US 2006/0034524 A1 Feb. 16, 2006

(30) Foreign Application Priority Data

Aug. 13, 2004 (JP) .............................. 2004-235943
Jul. 20, 2005 (JP) .............................. 2005-209516

(51) Int. Cl.
G06K 9/36 (2006.01)
G06K 9/40 (2006.01)
G06K 9/46 (2006.01)

(52) U.S. Cl. .................... 382/232; 382/275; 382/246

(58) Field of Classification Search ............... 382/115, 382/117, 118, 162, 164, 172, 173, 190, 232, 382/233, 243–248, 258, 260–264, 274–277; 375/240.18, 240.25
See application file for complete search history.

(56) References Cited

U.S. PATENT DOCUMENTS

| | | | | |
|---|---|---|---|---|
| 5,647,024 A | * | 7/1997 | Kawauchi et al. | 382/232 |
| 5,680,481 A | * | 10/1997 | Prasad et al. | 382/190 |
| 6,014,468 A | * | 1/2000 | McCarthy et al. | 382/254 |
| 6,339,657 B1 | * | 1/2002 | Yamaguchi et al. | 382/239 |
| 6,526,158 B1 | * | 2/2003 | Goldberg | 382/115 |
| 6,876,755 B1 | * | 4/2005 | Taylor et al. | 382/115 |
| 6,895,124 B1 | | 5/2005 | Kira et al. | |
| 7,209,577 B2 | * | 4/2007 | McAlpine et al. | 382/118 |
| 7,324,668 B2 | * | 1/2008 | Rubinstenn et al. | 382/118 |
| 7,356,194 B2 | * | 4/2008 | Kitamura et al. | 382/254 |
| 2006/0008173 A1 | * | 1/2006 | Matsugu et al. | 382/274 |
| 2006/0034524 A1 | * | 2/2006 | Kitamura | 382/232 |
| 2007/0071353 A1 | * | 3/2007 | Kitamura et al. | 382/264 |

FOREIGN PATENT DOCUMENTS

JP 7-203432 A 8/1995

* cited by examiner

*Primary Examiner*—Amir Alavi
(74) *Attorney, Agent, or Firm*—Birch, Stewart, Kolasch & Birch, LLP

(57) ABSTRACT

A plurality of band-limited images is produced from an original image. A transformed image is produced by processing each pixel value in the band-limited images so that the absolute value of an output value does not exceed that of an input value. The processing is non-linear transformation processing. If the absolute value of the input value does not exceed a predetermined threshold value, the absolute value of the output value increases as that of the input value increases, or if it exceeds the predetermined threshold value, the absolute value of the output value does not exceed that of an output value corresponding to the threshold value. Pixel values in the transformed image are multiplied by a predetermined subtraction coefficient, and subtracted from pixel values in the original image to obtain pixel values in a processed image. A compressed image is produced by performing entropy encoding on the processed image.

12 Claims, 6 Drawing Sheets

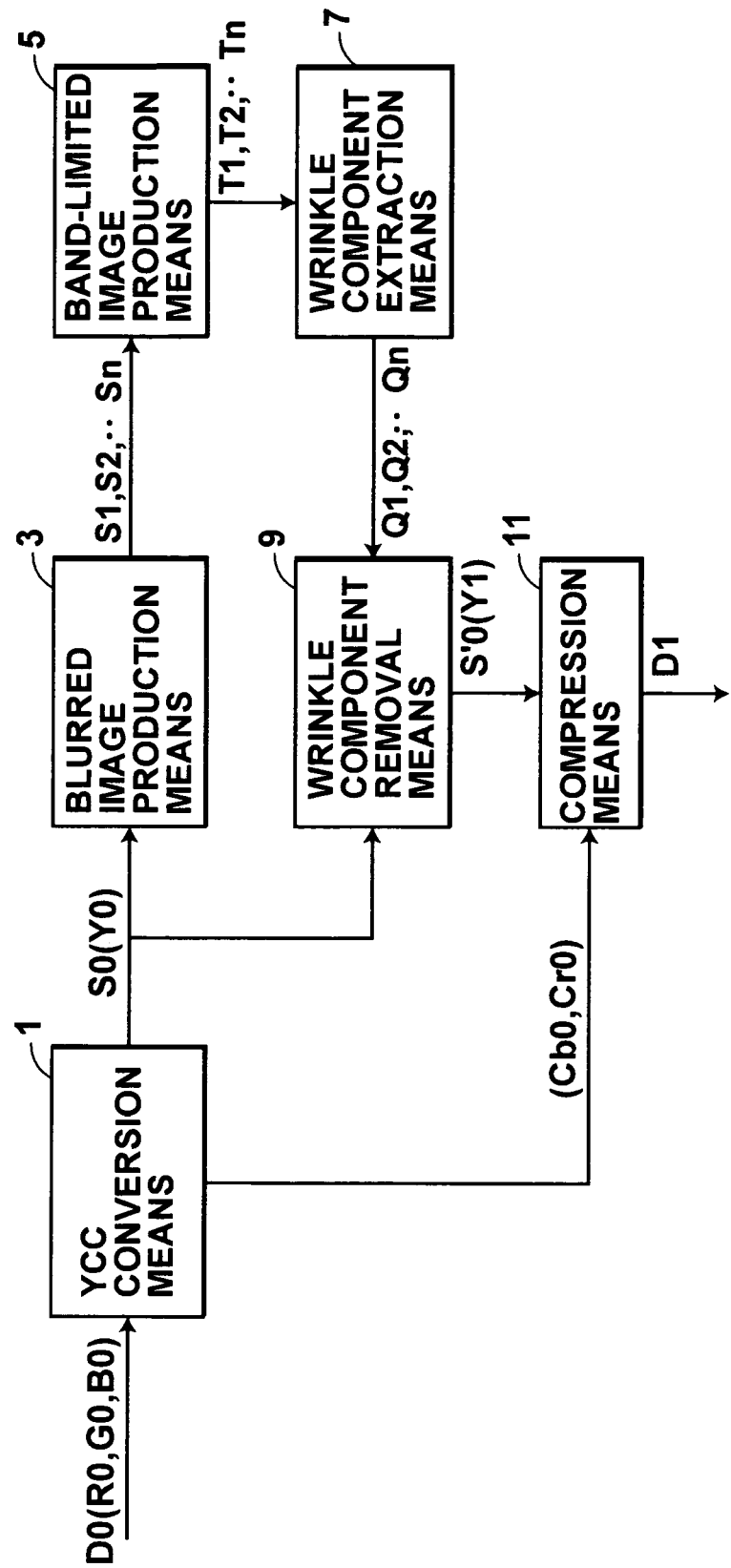

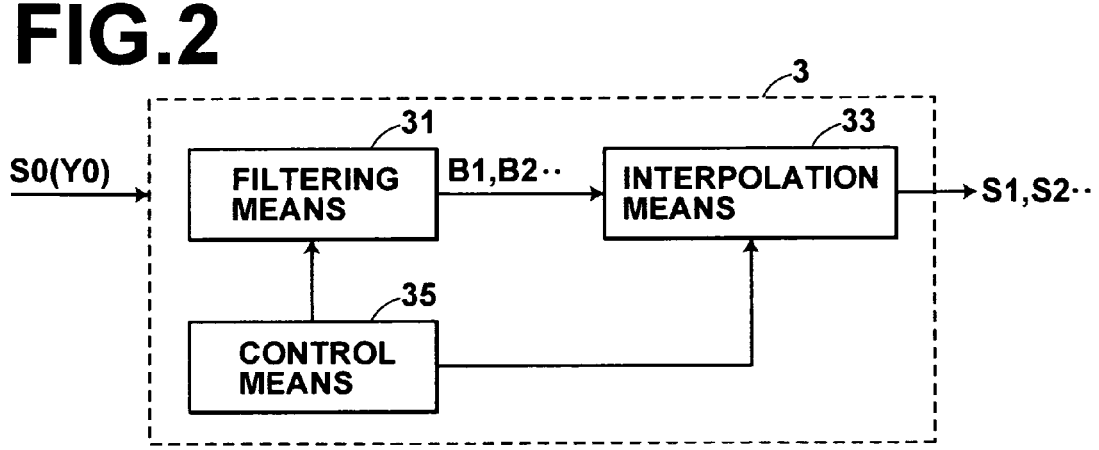

| 0.0025 | 0.0125 | 0.02 | 0.0125 | 0.0025 |
|---|---|---|---|---|
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

F1

| 0.1 | 0.5 | 0.8 | 0.5 | 0.1 |
|---|---|---|---|---|

F2

| 0.05 | 0.13 | 0.3 | 0.5 | 0.65 | 0.74 | 0.65 | 0.5 | 0.3 | 0.13 | 0.05 |
|---|---|---|---|---|---|---|---|---|---|---|

IMAGE PROCESSING APPARATUS, METHOD AND PROGRAM ON A COMPUTER-READABLE MEDIUM THAT INCREASES COMPRESSION RATE

BACKGROUND OF THE INVENTION

1. Field of the Invention

The present invention relates to an image processing apparatus and image processing method for compressing an original image such as a photographic image by performing entropy encoding on the original image. The present invention also relates to a program for causing a computer to execute the image processing method.

2. Description of the Related Art

Generally, in the field of JPEG (Joint Photographic Experts Group) compression, image data is divided into blocks, and discrete cosine transform (DCT) is performed on the image data. Then, bit allocation is determined, and quantized data is obtained by quantizing the image data. Then, entropy encoding is performed on the quantized data by using a technique such as run length encoding and Huffman encoding. In the encoding method using the DCT, data in each of the blocks is decomposed into direct current components and alternating current components. The alternating current components are components which represent structures in a frequency range including both low frequencies and high frequencies in each of the blocks. Therefore, the image data can be compressed by performing frequency conversion on the image data by using a technique such as wavelet transform, and further performing entropy encoding on the data which is obtained by the frequency conversion.

A method has been proposed to increase a compression rate of an image, in other words, to compress the image more, without lowering the visual quality of the image. In this method, when the image is compressed by performing entropy encoding, as described above, the quantization step is modified according to the average luminance of a DCT coefficient obtained by DCT (Japanese Unexamined Patent Publication No. 7(1995)-203432).

Conventionally, beautiful skin processing is performed on an original image (hereinafter, simply referred to as an image, for short) which includes a human face to suppress or remove wrinkles, freckles, or the like, which are included in the photographic image. For example, a low-pass filter (LPF), which is generally used for noise reduction processing, may be applied to the photographic image to perform beautiful skin processing.

Further, a method for removing wrinkles, freckles, or the like while retaining the volume texture and surface texture of skin is disclosed in U.S. Pat. No. 6,895,124. In this method, components such as wrinkles are extracted from an image by applying a non-linear function using a large threshold value $_e0$. Then, components representing the volume texture or surface texture of the skin are extracted from the image by applying a non-linear function using a small threshold value $_e0$. Further, the components such as the wrinkles are subtracted from original signals, and the components representing the volume texture and surface texture of the skin are added to the original signals. Accordingly, the wrinkles, freckles, or the like are removed, and the volume texture and surface texture of the skin are retained at the same time.

When the image is compressed as described above, if the image is compressed at a higher compression rate, the data amount of a compressed image can be reduced. However, the image quality deteriorates.

SUMMARY OF THE INVENTION

In view of the foregoing circumstances, it is an object of the present invention to increase a compression rate without lowering the image quality of a compressed image by using a technique for removing wrinkles, freckles, or the like when images are compressed by performing entropy encoding.

An image processing apparatus according to the present invention is an image processing apparatus comprising:

a band-limited image production means for producing, based on an original image, a plurality of band-limited images which represent components in a plurality of frequency bands in the original image;

a transformation means for producing a plurality of transformed images by processing each pixel value in each of the band-limited images so that the absolute value of an output value becomes less than or equal to that of an input value;

a multiplication means for multiplying pixel values in the plurality of transformed images by a predetermined subtraction coefficient to obtain multiplied pixel values;

a subtraction processing means for obtaining pixel values in a processed image by subtracting the multiplied pixel values in the plurality of transformed images from pixel values in the original image; and a compression means for producing a compressed image by performing entropy encoding on the processed image, wherein the processing by the transformation means is non-linear transformation processing; and wherein, in the non-linear transformation processing which is performed so that if the absolute value of the input value is less than or equal to a predetermined threshold value, the absolute value of the output value increases as the absolute value of the input value increases, or if the absolute value of the input value is larger than the predetermined threshold value, the absolute value of the output value becomes less than or equal to the absolute value of an output value corresponding to the predetermined threshold value.

Here, the "original image" includes not only a photographic image but also an animation image. The "photographic image" includes not only a digital image obtained by taking a photograph of a subject with a digital camera or the like but also a digital image obtained by reading out an image from silver-halide film, printed materials (for example, a print), or the like with a readout apparatus such as a scanner.

Further, the term "wrinkle component" refers to not only a wrinkle included in a face but also a component such as noise or a freckle, which is included in a face, and of which removal can improve the volume texture or surface texture of a facial skin, and make a person look younger.

Here, the predetermined subtraction coefficient which is used for each pixel in the original image may have the same value. However, it is preferable that the subtraction coefficient is determined based on the pixel value in the original image.

When wrinkle components such as noise, wrinkles, and freckles appear in an image, they are formed in various manners which correspond to pixel values in the image. For example, more noise is generated in a dark region (namely, a region including pixels which have low luminance values) in the image. Therefore, if a smaller subtraction coefficient is used for a pixel as the pixel value is larger (or, if a larger subtraction coefficient is used as the pixel value is smaller), a noise removal effect can be improved.

Further, the components such as the wrinkles and freckles are present in a flesh color region which is brighter than a hair region or the like. Therefore, if a larger subtraction coefficient is used as a pixel value, for example, a luminance value is larger (or, if a smaller subtraction coefficient is used as the pixel value is smaller), the components such as the wrinkles and freckles can be removed. Particularly, an effect of suppressing the components such as the wrinkles and freckles, so-called beautiful skin effect, can be achieved.

Further, it is preferable that the non-linear transformation processing is performed so that the absolute value of the output value is substantially constant when the absolute value of the input value is larger than the predetermined threshold value.

Further, it is preferable that the predetermined threshold value is determined based on the frequency band of the band-limited image to be processed.

In the image processing apparatus according to the present invention, the compression means may be a means for producing a frequency image for each of a plurality of frequency bands by performing frequency conversion on the processed image, and further performing entropy encoding on the frequency image.

Further, it is preferable that the original image includes a face in the image processing apparatus according to the present invention.

The image processing method according to the present invention is an image processing method comprising the steps of:

producing, based on an original image, a plurality of band-limited images which represent components in a plurality of frequency bands in the original image;

producing a plurality of transformed images by processing each pixel value in each of the band-limited images so that the absolute value of an output value becomes less than or equal to that of an input value;

multiplying pixel values in the plurality of transformed images by a predetermined subtraction coefficient to obtain multiplied pixel values;

obtaining pixel values in a processed image by subtracting the multiplied pixel values in the plurality of transformed images from pixel values in the original image; and producing a compressed image by performing entropy encoding on the processed image, wherein the processing for producing the plurality of transformed images is non-linear transformation processing which is performed so that if the absolute value of the input value is less than or equal to a predetermined threshold value, the absolute value of the output value increases as the absolute value of the input value increases, or if the absolute value of the input value is larger than the predetermined threshold value, the absolute value of the output value becomes less than or equal to the absolute value of an output value corresponding to the predetermined threshold value.

The image processing method according to the present invention may be provided as a program for causing a computer to execute the image processing method.

According to the present invention, a plurality of transformed images is produced by performing non-linear transformation processing on a plurality of band-limited images which are produced based on an original image, and which represent components in a plurality of different frequency bands in the original image. Then, the plurality of transformed images is multiplied by a predetermined subtraction coefficient to obtain multiplied pixel values. The multiplied pixel values in the plurality of transformed images are subtracted from pixel values in the original image to obtain pixel values in a processed image. Then, entropy encoding is performed on the processed image, and a compressed image can be produced.

Here, the non-linear transformation processing for producing the plurality of transformed images is processing for outputting a value of which the absolute value is less than or equal to that of an input value. Further, the non-linear transformation processing is performed so that if the absolute value of the input value is less than or equal to a predetermined threshold value, the absolute value of the output value increases as the absolute value of the input value increases, or if the absolute value of the input value is larger than the predetermined threshold value, the absolute value of the output value becomes less than or equal to the absolute value of an output value corresponding to the predetermined threshold value. Each of the transformed images, which are produced by the non-linear transformation processing, represents wrinkle components such as wrinkles, freckles and noise. The wrinkle components are components which have low amplitude in a frequency band to which each of the transformed images corresponds. Therefore, if pixel values in the plurality of transformed images are multiplied by a predetermined subtraction coefficient to obtain multiplied pixel values, and the multiplied pixel values are subtracted from pixel values in the original image, the wrinkle components such as the wrinkles, freckles and noise in the plurality of frequency bands can be effectively removed from the original image.

Meanwhile, the wrinkle components in the original image are components which have relatively low contrast and very low amplitude. Therefore, very low amplitude components are removed in a processed image. If the processed image is compared with the original image, the processed image has a wider flat region, of which the signal values are constant. Hence, when the wrinkle components are removed, the image quality is improved. Additionally, when entropy encoding is performed, the compression rate can be increased.

Further, in the present invention, the transformed images representing the wrinkle components are produced based on the band-limited images, as describe above. Therefore, the wrinkle components in a very wide frequency band can be removed from the original image. Hence, a flat region of which the signal values are constant can be increased for each frequency band by performing frequency conversion on the processed image by using discrete cosine transform, wavelet transform, or the like to produce a frequency band image (DCT coefficient, wavelet transform coefficient, or the like) for each of the plurality of frequency bands, and performing entropy encoding on the frequency band image. Consequently, the compression rate of the original image can be increased.

If the original image includes a face, when a facial image is stored in a database to perform human recognition, the size of the database can be reduced.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 1 is a block diagram illustrating the configuration of an image processing apparatus according to an embodiment of the present invention;

FIG. 2 is a block diagram illustrating the configuration of a blurred image production means in the image processing apparatus illustrated in FIG. 1;

FIG. 3 is a diagram illustrating an example of a one-dimensional filter F which is used by a filtering means in the blurred image production means illustrated in FIG. 2;

DESCRIPTION OF THE PREFERRED EMBODIMENTS

Figure 4:
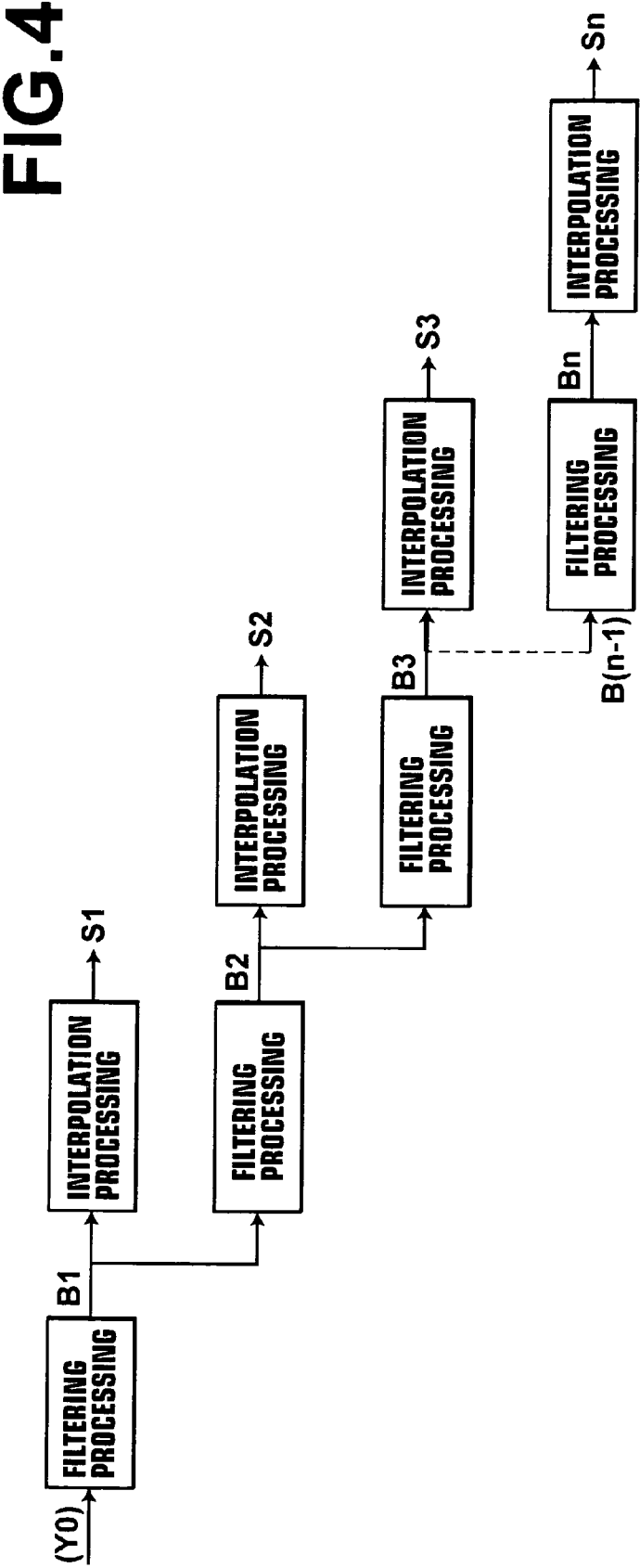
FIG. 4 is a flow chart illustrating processing performed by the blurred image production means illustrated in FIG. 2.

Hereinafter, embodiments of the present invention will be described with reference to the attached drawings. FIG. 1 is a block diagram illustrating the configuration of an image processing apparatus according to an embodiment of the present invention. The image processing apparatus according to the present embodiment is an apparatus for performing beautiful skin processing on photographic images including persons (hereinafter, referred to as images for short) and compressing processed image data, on which beautiful skin processing has been performed. The present invention is realized by causing a computer (for example, a personal computer, or the like) to execute a compression processing program which is stored in a supplementary storage device of the computer. Further, the compression processing program is distributed by being stored in an information storage medium such as a CD-ROM (compact disk-read only memory), or distributed through a network such as the Internet, and the program is installed in a computer.

Since image data is data representing an image, the image and the image data are not particularly differentiated from each other in the following description.

As illustrated in FIG. 1, the image processing apparatus according to the present embodiment includes a blurred image production means 3 for producing a plurality of blurred images S1, S2, . . . Sn (n: integer, n is larger than or equal to 2) from an original image S0. The plurality of blurred images is images of which the frequency response characteristics are different from each other. The image processing apparatus also includes a band-limited image production means 5 for producing a plurality of band-limited images T1, T2, . . . Tn using the original image S0 and the blurred images S1 S2, . . . Sn. The image processing apparatus also includes a wrinkle component extraction means 7 for extracting each of wrinkle components Q1, Q2, . . . Qn in each of frequency bands to which the band-limited images correspond by performing non-linear transformation on the band-limited images T1, T2, . . . Tn. The image processing apparatus also includes a wrinkle component removal means 9 for producing a wrinkle-removed image S'0 (Y1) by removing the wrinkle components from the original image S0. The image processing apparatus also includes a compression means 11 for producing a compressed image D1 by performing JPEG compression on the wrinkle-removed image S'0 (Y1) and chrominance values Cb0 and Cr0 obtained by a YCC (luminance, chrominance blue, and chrominance red) transformation means 1.

Each composition element in the present embodiment will be described below in detail.

The YCC transformation means 1 transforms R, G, and B values of each pixel in an image D0 into a luminance value Y and chrominance values Cb and Cr using the following formulas (1):

$$Y = 0.2990 \times R + 0.5870 \times G + 0.1140 \times B$$

$$Cb = -0.1687 \times R - 0.3313 \times G + 0.5000 \times B + 128$$

$$Cr = 0.5000 \times R - 0.4187 \times G - 0.0813 \times B + 128. \quad (1)$$

The blurred image production means 3 produces a plurality of blurred images using a luminance value Y0 obtained by the YCC transformation means 1. FIG. 2 is a block diagram illustrating the configuration of the blurred image production means 3. In the image processing apparatus according to the present embodiment, the blurred image production means 3 includes a filtering means 31 for obtaining filtering images B1, B2, . . . Bn by performing filtering processing on the luminance value Y0. The blurred image production means 3 also includes an interpolation means 33 for performing interpolation processing on each of the filtering images. The blurred image production means also includes a control means 35 for controlling the filtering means 31 and the interpolation means 33.

The filtering means 31 performs filtering processing using a low-pass filter. For example, A filter F as illustrated in FIG. 3 may be used as the low-pass filter. The filter F is a 5×1 grid filter, and the filter approximately corresponds to one-dimensional Gaussian distribution. The filter F is represented by the following formula (2), when σ=1:

$$f_{(t)} = e^{-\frac{t^2}{2\delta^2}} \quad (2)$$

The filtering means 31 performs filtering processing on the image, which is a processing object, using the filter F as described above. The filtering means 31 performs filtering processing on pixels in both x and y directions. Accordingly, the filtering means 31 performs filtering processing on the whole image of the processing object.

Figures 5, 6, 7, 8:
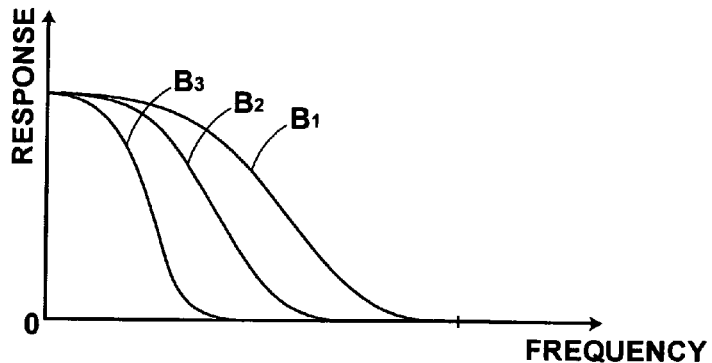
FIG. 5 is a diagram illustrating the frequency characteristics of filtering images produced by the filtering means in the blurred image production means illustrated in FIG. 2.
FIG. 6 is a diagram illustrating an example of a two-dimensional filter which is used by the filtering means in the blurred image production means illustrated in FIG. 2.
FIG. 7 is a diagram illustrating an example of a filter F1 which is used by an interpolation means in the blurred image production means illustrated in FIG. 2 to perform interpolation processing on a filtering image B1.
FIG. 8 is a diagram illustrating an example of a filter F2 which is used by an interpolation means in the blurred image production means illustrated in FIG. 2 to perform interpolation processing on a filtering image B2.

FIG. 4 is a diagram illustrating processing performed by the filtering means 31 and the interpolation means 33 in detail. The control means 35 in the blurred image production means 3 causes the filtering means 31 and the interpolation means 33 to perform the processing. As illustrated in FIG. 4, first, the filtering means 31 performs filtering processing on the original image S0 (Y0) using the filter F illustrated in FIG. 3. The processing is performed on every other pixel in the original image S0 (Y0). Accordingly, a filtering image B1 (Y1) is obtained by the filtering processing. The size of the filtering image B1 is ¼ (½ in the x and y directions, respectively) of the original image S0. Next, the filtering means 31 further performs filtering processing on the filtering image B1 (Y1) using the filter F. The processing is performed on every other pixel in the filtering image B1 (Y1), and a filtering image B2 (Y2) is obtained. The filtering means 31 repeats the filtering processing using the filter F, as described above, and n number of filtering images Bk (k=1 through n) is obtained. The size of the filtering image Bk is $\frac{1}{2}^{2K}$ of that of the original image S0. FIG. 5 illustrates the frequency characteristic of each of the filtering images Bk obtained by the filtering means 31, when n=3. The response of the filtering image Bk is illustrated in FIG. 5. As illustrated in FIG. 5, as the value k of the filtering image Bk is larger, more high frequency components are removed from the image.

In the image processing apparatus according to the present embodiment, the filtering means 31 performs filtering processing on the image in the x and y directions of the image using the filter F illustrated in FIG. 3. Alternatively, a two-dimensional filter of 5×5 as illustrated in FIG. 6 may be used, and filtering processing may be performed at once when processing is performed on each of the original image S0 and the filtering images Bk.

The interpolation means 33 performs interpolation processing on each of the filtering images Bk obtained by the filtering means 31 to change the size of each of the filtering images Bk to the same size as that of the original image S0. As interpolation methods, there are various kinds of methods such as B spline interpolation. However, since the filtering means 31 uses the filter F based on Gaussian signals as the low-pass filter, the interpolation means 33 also uses the Gaussian signals as an interpolation coefficient for performing interpolation processing. The interpolation coefficient is given by the following formula (3) when approximating σ=2K −1.

$$I_{(t)} = 2 \times \delta \times e^{-\frac{t^2}{2\delta^2}} \quad (3)$$

When interpolation processing is performed on the filtering image B1, k=1. Therefore, σ=1. A filter for performing interpolation processing given by the above formula (3) when σ=1 is a one-dimensional filter F1 of 5×1, as illustrated in FIG. 7. First, the interpolation means 33 performs interpolation processing on the filtering image B1, and interpolates a pixel which has a value of 0 between each of adjacent pixels in the filtering image B1 to enlarge the filtering image B1 to the same size as that of the original image S0. Next, filtering processing is performed on the enlarged image using the filter F1 illustrated in FIG. 7, and a blurred image S1 is produced. The number of pixels of the blurred image S1 is the same as that of the original image S0. In other words, the size of the blurred image S1 is the same as that of the original image S0.

Here, the filter F1 illustrated in FIG. 7 is a filter of 5×5. However, since a pixel which has a value of 0 was interpolated between each of adjacent pixels in the filtering image B1 before the filter F1 is applied to the image, the interpolation processing by the interpolation means 33 is substantially equivalent to filtering processing using two kinds of filters, namely a 2×1 filter of (0.5, 0.5) and a 3×1 filter of (0.1, 0.8, 0.1).

When the interpolation means 33 performs interpolation processing on the filtering image B2, k=2. Therefore, σ=2. In the above formula (3), a filter corresponding to σ=2 is a one-dimensional filter F2 of 1×1, which is illustrated in FIG. 8. First, the interpolation means 33 performs interpolation processing on the filtering image B2, and interpolates three pixels which all have a value of 0 between each of adjacent pixels in the filtering image B2 to enlarge the filtering image B2 to the same size as that of the original image S0. Next, filtering processing is performed on the enlarged image using the filter F2 illustrated in FIG. 8, and a blurred image S2 is produced. The number of pixels in the blurred image S2 is the same as the number of pixels in the original image S0. In other words, the size of the blurred image S2 is the same as that of the original image S0.

Similarly, although the filter F2 illustrated in FIG. 8 is a filter of 11×1, since three pixels which have a value of 0 were interpolated between each of adjacent pixels in the filtering image B2 before the filter F2 is applied to the image, the interpolation processing by the interpolation means 33 is substantially equivalent to filtering processing using four kinds of filters, namely a 2×1 filter of (0.5, 0.5), and 3×1 filters of (0.3, 0.65, 0.05), (0.3, 0.74, 0.13), and (0.05, 0.65, 0.3).

The interpolation means 33 enlarges each of the filtering images Bk to the same size as that of the original image S0 by performing interpolation processing on each of the filtering images Bk, and interpolating (2K−1) number of pixels which have a value of 0 between each of adjacent pixels in each of the filtering images Bk. Then, filtering processing is performed on each of the filtering images Bk in which pixels which have a value of 0 have been interpolated. The filtering processing is performed using a filter which is produced based on the above formula (3), and which has a length of (3×2K−1). Accordingly, blurred images Sk are produced.

Figure 9:
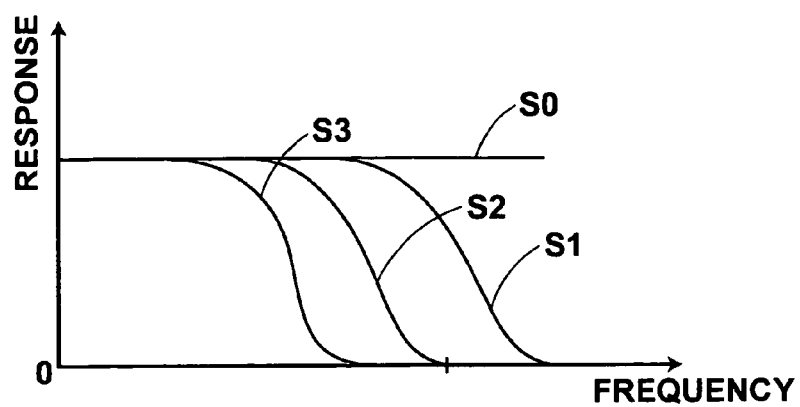
FIG. 9 is a diagram illustrating the frequency characteristic of a blurred image produced by the blurred image production means illustrated in FIG. 2.

FIG. 9 illustrates a frequency characteristic of each of the blurred images Sk, which are produced by the blurred image production means 3, when n=3, for example. As illustrated in FIG. 9, more high frequency components are removed from the original image S0 as the value k in the blurred image Sk is larger.

The band-limited image production means 5 produces band-limited images T1, T2, . . . Tn which represent components in a plurality of frequency bands in the original image S0. The band-limited image production means 5 produces the band-limited images T1, T2, . . . Tn based on the following formula (4) using each of the blurred images S1, S2, . . . Sn.

$$Tm=S(m-1)-Sm, \quad (4)$$

where m: integer, m is larger than or equal to 1, and less than or equal to n.

Figure 10:
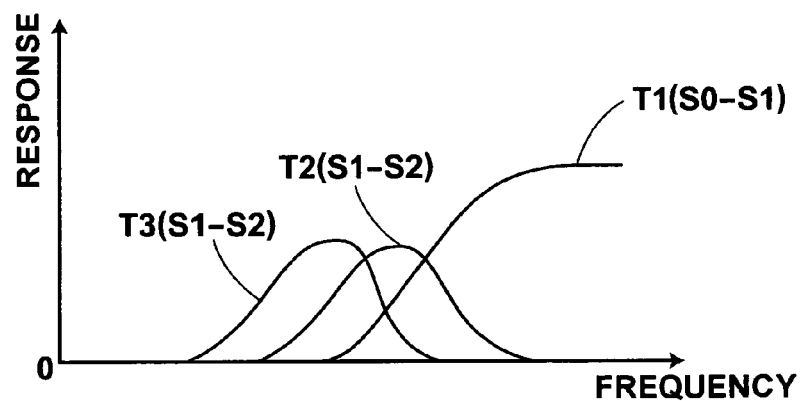
FIG. 10 is a diagram illustrating the frequency characteristic of a band-limited image produced by a band-limited image production means in the image processing apparatus according to the embodiment of the present invention, which is illustrated in FIG. 1.

FIG. 10 illustrates a frequency characteristic of each of the band-limited images Tm, which are produced by the band-limited image production means 5, when n=3, for example. As illustrated in FIG. 10, the band-limited image Tm represents lower frequency components in the original image S0 as the value m is larger.

Figure 11:
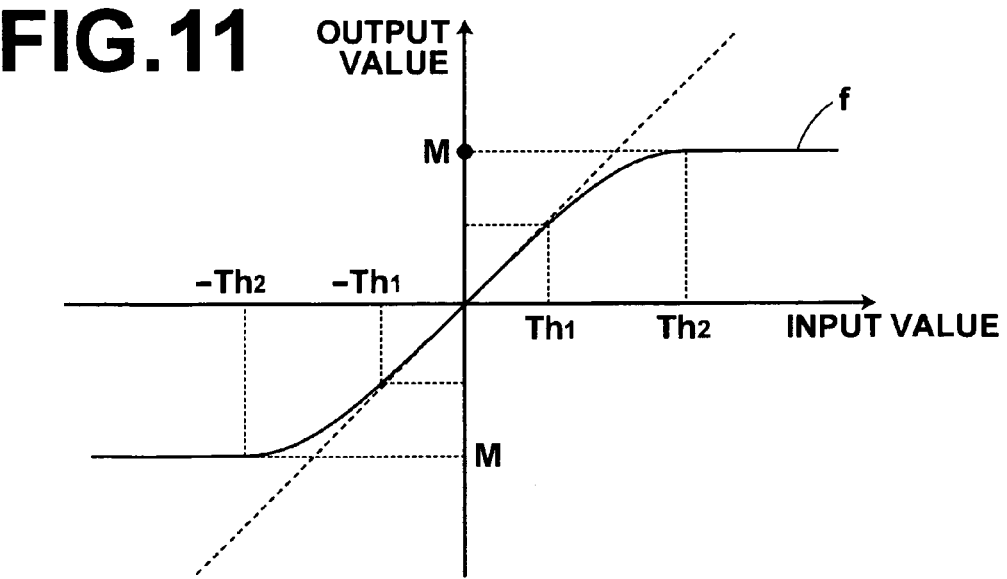
FIG. 11 is a diagram illustrating an example of a non-linear function which is used by a wrinkle component extraction means in the image processing apparatus according to the embodiment of the present invention, which is illustrated in FIG. 1.

The wrinkle component extraction means 7 performs non-linear transformation on each of the band-limited images Tm (m=1 through n) which are produced by the band-limited image production means 5. Accordingly, the wrinkle component extraction means 7 extracts components such as wrinkles, freckles, and noise (hereinafter referred to as wrinkle components) Q1, Q2, . . . Qn in frequency bands to which the band-limited images Tm correspond. The non-linear transformation is processing for outputting a value of which the absolute value is less than or equal to that of an input value. The non-linear transformation is also performed so that if a value of which the absolute value is less than or equal to a predetermined threshold value is input, the absolute value of the output value increases as the absolute value of the input value increases, or if a value of which the absolute value is larger than the predetermined threshold value is input, the absolute value of the output value becomes less than or equal to that of an output value corresponding to the predetermined threshold value. In the present embodiment, the non-linear transformation is performed by a function f which is illustrated in FIG. 11. The broken line in FIG. 11 represents a function when output values=input values, in other words, the gradient of the function is 1. As illustrated in FIG. 11, when the absolute value of the input value is less than a first threshold value Th1, the gradient of the function f for non-linear transformation, which is used by the wrinkle component extraction means 7 according to the present embodiment, is 1. The gradient of the function f is less than 1 when the absolute value of the input value is larger than or equal to the first threshold value and less than or equal to a second threshold value Th2. When the absolute value of the input value is larger than the second threshold value Th2, the output value is a constant value M, of which the absolute value is less than that of the input value. The same function f may be used for all of the band-limited images. Alternatively, different functions may be used for each of the band-limited images.

The wrinkle component extraction means 7 uses the luminance value of each of the band-limited images as an input value. The wrinkle component extraction means 7 performs non-linear transformation on each of the band-limited images using the function f for non-linear transformation, which is illustrated in FIG. 11. Accordingly, the wrinkle component extraction means 7 extracts the wrinkle components Qm (m=1 through n) in the frequency bands to which the band-limited images correspond. The extracted wrinkle components are components including the luminance values of output values The wrinkle component removal means 9 multiplies each of the wrinkle components Qm, which were extracted by the wrinkle component extraction means 7, by a subtraction coefficient $\beta$. Then, the wrinkle component removal means 9 subtracts the wrinkle component Qm which has been multiplied by the subtraction coefficient from the original image S0 (Y0). Accordingly, wrinkle-removed image S'0 (Y1) is produced. The following formula (5) represents processing performed by the wrinkle component removal means 9.

$$S'0 = S0 - \beta(S0)\sum_{m=1}^{n} Qm, \tag{5}$$

where $n \geq 2$
S0: original image
Qm (m=1 through n): wrinkle component
$\beta$: subtraction coefficient.

Here, the subtraction coefficient $\beta$ is determined based on the luminance value Y0 of the pixel in the original image S0. Specifically, as the luminance value Y0 of the pixel is larger, the value of the subtraction coefficient $\beta$, which is used to obtain the pixel value Y1 of the pixel, increases. The wrinkle components Qm extracted by the wrinkle component extraction means 7 include components such as hair in some cases. If the components such as the hair are removed in the same manner as removal of the true wrinkle components, there are problems that a hair region in the image is blurred, and the quality of the processed image is not good.

In the present embodiment, the general characteristic of images that a flesh color region in which the wrinkles or the like appear is light (in other words, the luminance value is high), and that a hair region is dark (in other words, the luminance value is low) are utilized. A subtraction coefficient $\beta$ which has a larger value is used as the luminance value of a pixel is higher. Accordingly, the degree of subtraction (namely, removal of wrinkles) in the hair region is reduced, and the degree of subtraction (namely, removal of wrinkles) in the flesh color region is increased. Hence, the true wrinkle components such as the wrinkle, freckles, and noise can be removed without removing the components representing hair. Since the hair region is not blurred, the quality of the processed image is improved.

The compression means 11 divides the luminance value Y1 obtained by the wrinkle component removal means 9 and the chrominance values Cb0 and Cr0 of the image D0, obtained by the YCC transformation means 1, into a block of 8×8 pixels. Then, the compression means performs discrete cosine transform (DCT) on each block, and obtains a DCT coefficient for each of a plurality of frequency bands. The compression means 11 obtains a compressed image D1 by performing quantization and entropy encoding (run length encoding, Huffman encoding, and the like) on the DCT coefficient, and outputs the obtained compressed image D1.

Here, the wrinkle component in the photographic image is a component which has relatively low contrast and very low amplitude. The very low amplitude components are removed in a wrinkle-removed image S'0 (Y1). Therefore, a flat region which has constant signal values is increased in the wrinkle-removed image S'0 (Y1). Hence, the compression rate can be improved when entropy encoding is performed in JPEG compression. Consequently, in the present embodiment, the image quality can be improved by removing the wrinkle components. Further, the compression rate can be improved when JPEG compression is performed.

Further, if the value M in the function f illustrated in FIG. 11 is reduced, the degree of removing the wrinkle components can be increased. Therefore, if the degree of removing the wrinkle components is increased, a flat region which includes constant signal values is increased. Hence, the compression rate can be improved when the entropy encoding is performed. Accordingly, in the present embodiment, the compression rate can be changed by changing the value M in the function f illustrated in FIG. 11.

Further, in the present embodiment, the wrinkle components are obtained from the band-limited images, as described above. Therefore, the wrinkle components in a very wide frequency band can be removed from the photographic image. Therefore, when entropy encoding is performed by obtaining a DCT coefficient for each of a plurality of frequency bands by performing discrete cosine transform on the wrinkle-removed image S'0 (Y1), a flat region which includes constant signal values can be increased in each of the frequency bands. Therefore, the compression rate of the photographic image can be improved.

Further, when the photographic image includes a face, the size of a database for storing facial images, for example, to perform human recognition can be reduced.

So far, preferred embodiments of the present invention have been described. However, the image processing method, apparatus, and program of the present invention are not limited to the embodiments as described above. Various modifications and additions or reductions are possible without deviating from the spirit and scope of the invention.

For example, in the image processing apparatus according to the present embodiment, the band-limited image production means 5 produces a band-limited image, based on the above formula (4), by using the original image S0 and the blurred image Sk (k=1 through n, n≧2). The processing performed by the band-limited image production means 5, the wrinkle component extraction means 7, and the wrinkle component removal means 9 may be represented by the following formula (6). However, the processing by the band-limited image production means 5, wrinkle component extraction means 7, and the wrinkle component removal means 9 may be also performed based on the following formulas (7), (8), and (9), for example. Specifically, the band-limited image may be produced by performing processing represented by the formula (6), as performed by the image processing apparatus according to the present embodiment. In the image processing apparatus according to the present embodiment, the band-limited image is produced by performing subtraction between images in frequency bands which are adjacent to each other by using the original image and each of the blurred images (it is assumed that the frequency band of the original image S0 and that of the blurred image S1 are adjacent to each other). Alternatively, the band-limited image may be produced by performing subtraction between all the blurred images and the original image, as illustrated in formula (7). Further, the band-limited image may be produced by performing subtraction between the blurred images in frequency bands which are adjacent to each other without using the original image, as illustrated in formula (8). Further, the band-limited image may be produced by performing subtraction between the blurred image S1 and all of the blurred images Sm (m=2 through n, n≧3) excluding the blurred image S1 without using the original image, as illustrated in formula (9).

$$S'0 = S0 - \beta(S0) \sum_{m=1}^{n} f_m(S(m-1) - Sm), \quad (6)$$

where, $n \geq 2$

S0: original image

Sm ($m = 1$ through $n$): blurred image $f_m$: non-linear transformation function $\beta$: substraction coefficient $$S'0 = S0 - \beta(S0) \sum_{m=1}^{n} \frac{1}{n} \cdot f_m(S0 - Sm), \quad (7)$$

where, $n \geq 2$

S0: original image

Sm ($m = 1$ through $n$): blurred image $f_m$: non-linear transformation function $\beta$: substraction coefficient $$S'0 = S0 - \beta(S0) \sum_{m=1}^{n} f_m(Sm - S(m+1)) \quad (8)$$

where, $n \geq 3$

S0: original image

Sm ($m = 1$ through $n$): blurred image $f_m$: non-linear transformation function $\beta$: substraction coefficient $$S'0 = S0 - \beta(S0) \sum_{m=2}^{n} \frac{1}{n-1} \cdot f_m(S1 - Sm) \quad (9)$$

where, $n \geq 3$

S0: original image

Sm ($m = 1$ through $n$): blurred image $f_m$: non-linear transformation function $\beta$: substraction coefficient Further, the method for producing the band-limited image is not limited to the methods illustrated in the formulas (4) and (6) through (9) as described above. In the method illustrated in the formulas (4) and (6) through (9), the blurred images of the original image are produced, and the band-limited images are produced by using the original image and/or the blurred images. The band-limited images may be produced in any kinds of methods as far as images representing a plurality of different frequency bands of the original image can be produced.

Further, in the present embodiment, beautiful skin processing is performed on the whole photographic image. However, only a flesh color region may be extracted from the photographic image, and beautiful skin processing may be performed only on the extracted region. Especially, when beautiful skin processing is performed on the region of arms or the like, downy hair or the like can be removed from the image.

Further, when image processing is performed to achieve a beautiful skin effect in a facial region of the photographic image, the facial region may be extracted from the photographic image by using various kinds of conventional face extraction techniques, and beautiful skin processing may be performed only on the extracted facial region. Accordingly, the calculation amount for the beautiful skin processing can be reduced. Further, it is possible to prevent the region other than the flesh color region or facial region in the photographic image from becoming blurred. Further, since the brightness of the skin is different according to race, the degree of beautiful skin processing may be changed based on the brightness of the extracted flesh color region. Accordingly, the image quality can be improved based on the skin color.

Further, when the ratio of the facial region in the original image is small, even if beautiful skin processing is performed, it is difficult to recognize the effect of processing in some cases. Therefore, when the facial region is extracted, beautiful skin processing may be performed only if the ratio of the facial region with respect to the original photographic image is greater than or equal to a predetermined value.

Further, in the embodiment as described above, the beautiful skin processing is performed on a photographic image which includes a person. However, beautiful skin processing may be performed on a photographic image which includes an animal. If beautiful skin processing is performed on the photographic image which includes an animal, wrinkles of an elephant or rhinoceros can be removed. Further, it is possible to increase the compression rate of the image.

Further, in the embodiment as described above, the beautiful skin processing is performed on the photographic image. However, beautiful skin processing may be performed, for example, on an animation image in a similar manner to the beautiful skin processing as described above. Accordingly, it is possible to remove an unevenly colored portion from the animation image. Therefore, it is possible to improve the image quality of the animation image, and increase the compression rate of the image.

Further, in the present embodiment, the subtraction coefficient β which is used to remove the wrinkle components is determined based on the luminance value Y0 of the original image. However, the subtraction coefficient may be changed, for example, based on the information about the subject of the photographic image, which is a processing object, in addition to the luminance value of the original image. For example, the subtraction coefficient may be increased to increase the effect of beautiful skin processing as the subject is older. Alternatively, the subtraction coefficient may be reduced to reduce the effect of beautiful skin processing as the subject is older. The effect of beautiful skin processing is reduced to prevent the processed image from becoming unnatural.

Similarly, the threshold value, particularly, the threshold value Th2, which is used to perform non-linear transformation on the band-limited image, may be changed based on the information about the subject. Here, the information about the subject may be obtained by performing recognition processing or by referring to tag information attached to the image D0. Alternatively, the information about the subject may be manually input by an operator.

Further, a parameter such as the subtraction coefficient, the threshold value for non-linear transformation, or the like may be changed based on the degree of a beautiful skin effect desired by the operator.

Further, the parameter as described above may be changed according to the purpose of producing the photographic image. The parameter may be changed for a photographic image of the deceased, a photographic image for a wedding, a photographic image for an automatic photography print apparatus (so-called print-club machine), or the like.

Further, in the image processing apparatus according to the present embodiment, the characteristics of the wrinkle components that they have low amplitude representing variation in lightness, however they do not have amplitude representing variation in colors, are utilized. In the image processing apparatus according to the present embodiment, beautiful skin processing is performed effectively by removing the wrinkle components only in a luminance space. However, the processing may be performed, for example, on all of the R, G, and B components to remove color wrinkle components in addition to the wrinkle components.

Further, since the main purpose of the image processing apparatus according to the present embodiment is to achieve the beautiful skin effect by suppressing the wrinkle and freckle components, a larger subtraction coefficient is used as the pixel value of the original image is larger. However, if the main purpose of the image processing apparatus is to remove noise from the image, a smaller subtraction coefficient may be used as the pixel value of the original image is larger.

Further, in the embodiments as described above, the compressed image D1 is obtained by performing JPEG compression on the wrinkle-removed image S'0 (Y1). However, the compressed image D1 may be obtained by any kinds of methods as far as the image data is compressed by using entropy coding. For example, frequency images in a plurality of frequency bands may be obtained by performing frequency processing such as wavelet transform on the wrinkle-removed image S'0 (Y1). Further, entropy encoding may be performed on each of the frequency images to obtain the compressed image D1.

Figure 12:
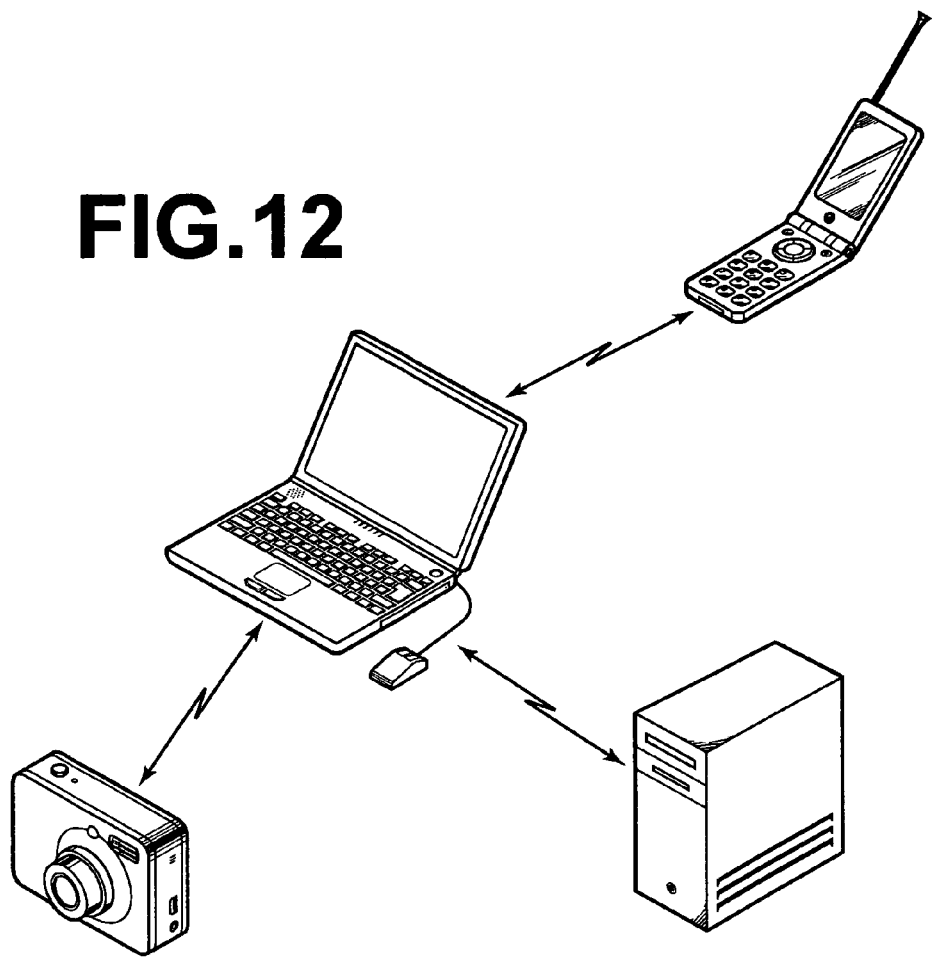
FIG. 12 is a diagram illustrating an example in which the processing performed by the image processing apparatus according to the present invention is performed at a personal computer.

In the embodiment as described above, the image processing apparatus is used alone. However, the beautiful skin processing may be performed by installing a program for executing the processing performed at the image processing apparatus in a personal computer. In this case, it is possible to send a compressed image D1 obtained at the personal computer to a cellular phone, server, digital camera, or the like through a network, as illustrated in FIG. 12. Accordingly, it is possible to reduce a transfer load when compared with a case of sending a photographic image before processing. Here, it is preferable to increase the effect of beautiful skin processing to increase the compression ratio as the communication band in the network is narrower.

What is claimed is:

1. An image processing apparatus comprising:
 a band-limited image production means for producing, based on an original image, a plurality of band-limited images which represent components in a plurality of frequency bands in the original image;
 a transformation means for producing a plurality of transformed images by processing each pixel value in each of the band-limited images so that the absolute value of an output value becomes less than or equal to that of an input value;
 a multiplication means for multiplying pixel values in the plurality of transformed images by a predetermined subtraction coefficient to obtain multiplied pixel values;
 a subtraction processing means for obtaining pixel values in a processed image by subtracting the multiplied pixel values in the plurality of transformed images from pixel values in the original image; and
 a compression means for producing a compressed image by performing entropy encoding on the processed image, wherein the processing by the transformation means is non-linear transformation processing which is performed so that if the absolute value of the input value is less than or equal to a predetermined threshold value, the absolute value of the output value increases as the absolute value of the input value increases, or if the absolute value of the input value is larger than the predetermined threshold value, the absolute value of the output value becomes less than or equal to the absolute value of an output value corresponding to the predetermined threshold value.

2. An image processing apparatus as defined in claim 1, wherein the compression means obtains a frequency image for each of a plurality of frequency bands by performing frequency conversion on the processed image, and further performs entropy encoding on the frequency image.

3. An image processing apparatus as defined in claim 1, wherein the transformation means and the multiplication means perform processing only on a flesh color region in the original image.

4. An image processing apparatus as defined in claim 1, wherein the original image includes a face.

5. An image processing method comprising the steps of:
 providing an original image
 processing the original image to provide a plurality of band-limited images which represent components in a plurality of frequency bands in the original image;
 processing each pixel value in each of the plurality of band-limited images to provide a plurality of transformed images in which an absolute value of an output value becomes less than or equal to that of an input value;

multiplying pixel values in the plurality of transformed images by a predetermined subtraction coefficient to obtain multiplied pixel values;

subtracting the multiplied pixel values in the plurality of transformed images from pixel values in the original image to obtain pixel values in a processed image; and producing a compressed image by performing entropy encoding on the processed image, wherein the processing for producing the plurality of transformed images is non-linear transformation processing which is performed so that if the absolute value of the input value is less than or equal to a predetermined threshold value, the absolute value of the output value increases as the absolute value of the input value increases, or if the absolute value of the input value is larger than the predetermined threshold value, the absolute value of the output value becomes less than or equal to the absolute value of an output value corresponding to the predetermined threshold value.

6. An image processing method as defined in claim 5, wherein a frequency image for each of a plurality of frequency bands is obtained by performing frequency conversion on the processed image, and wherein entropy encoding is performed on the frequency image.

7. An image processing method as defined in claim 5, wherein processing is performed only on a flesh color region in the original image.

8. An image processing method as defined in claim 5, wherein the original image includes a face.

9. A program on a computer-readable storage medium for causing a computer to execute an image processing method, the program comprising the procedures for:

producing, based on an original image, a plurality of band-limited images which represent components in a plurality of frequency bands in the original image;

producing a plurality of transformed images by processing each pixel value in each of the band-limited images so that the absolute value of an output value becomes less than or equal to that of an input value;

multiplying pixel values in the plurality of transformed images by a predetermined subtraction coefficient to obtain multiplied pixel values;

obtaining pixel values in a processed image by subtracting the multiplied pixel values in the plurality of transformed images from pixel values in the original image; and producing a compressed image by performing entropy encoding on the processed image, wherein the processing for producing the plurality of transformed images is non-linear transformation processing which is performed so that if the absolute value of the input value is less than or equal to a predetermined threshold value, the absolute value of the output value increases as the absolute value of the input value increases, or if the absolute value of the input value is larger than the predetermined threshold value, the absolute value of the output value becomes less than or equal to the absolute value of an output value corresponding to the predetermined threshold value.

10. A program on a computer-readable storage medium as defined in claim 9, wherein the procedure for producing the compressed image is a procedure for producing a frequency image for each of a plurality of frequency bands by performing frequency conversion on the processed image, and further performing entropy encoding on the frequency image.

11. A program on a computer-readable storage medium as defined in claim 9, wherein the procedure for producing the plurality of transformed images and the procedure for multiplying are preformed only on a flesh color region in the original image.

12. A program on a computer-readable storage medium as defined in claim 9, wherein the original image includes a face.

* * * * *